United States Patent
Sikri et al.

(10) Patent No.: US 9,198,099 B2
(45) Date of Patent: Nov. 24, 2015

(54) OPTIMIZED SCHEDULING SUBSCRIPTION PROCEDURES ON A WIRELESS COMMUNICATION DEVICE

(71) Applicant: QUALCOMM Incorporated, San Diego, CA (US)

(72) Inventors: Divaydeep Sikri, Farnborough (GB); Abeezar A. Burhan, Ickenham (GB); Mungal S. Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 13/777,069

(22) Filed: Feb. 26, 2013

(65) Prior Publication Data

US 2014/0119293 A1  May 1, 2014

Related U.S. Application Data

(63) Continuation-in-part of application No. 13/739,738, filed on Jan. 11, 2013, now Pat. No. 9,025,576, and a continuation-in-part of application No. 13/758,719, filed on Feb. 4, 2013, now abandoned.

(60) Provisional application No. 61/721,118, filed on Nov. 1, 2012.

(51) Int. Cl.
*H04W 36/06* (2009.01)
*H04W 72/12* (2009.01)
(Continued)

(52) U.S. Cl.
CPC ............ *H04W 36/06* (2013.01); *H04W 60/005* (2013.01); *H04W 72/12* (2013.01); *H04W 72/1215* (2013.01); *H04W 76/048* (2013.01); *H04W 68/02* (2013.01); *H04W 88/06* (2013.01)

(58) Field of Classification Search
USPC ................. 370/329, 336, 337, 328; 455/3.01, 455/422.1, 433, 435.2, 450, 552.1
See application file for complete search history.

(56) References Cited

U.S. PATENT DOCUMENTS 6,959,201 B2   10/2005  Leprieur et al.
7,415,272 B2 *  8/2008  Khushu et al. ................ 455/424
(Continued)

FOREIGN PATENT DOCUMENTS

WO   2007036962 A1   4/2007

OTHER PUBLICATIONS

Ericsson: "Dual-SIM Dual-Standby UEs and their impact on the RAN", 3GPP Draft; R2-115375 Dual-SIM Dual-Standby UES and Their Impact on the RAN, 3rd Generation Partnership Project (3GPP), Mobile Competence Centre ; 650, Route Des Lucioles ; F-06921 Sophia-Antipolis Cedex ; France, vol. RAN WG2, no. Zhuhai; 20111010, Oct. 3, 2011, XP050540879, [retrieved on Oct. 3, 2011].

(Continued)

*Primary Examiner* — Edan Orgad
*Assistant Examiner* — Emmanuel Maglo
(74) *Attorney, Agent, or Firm* — Michael J. DeHaemer, Jr.

(57) ABSTRACT

Devices, systems, articles of manufacture, and methods scheduling subscription procedures on a wireless communication device are described. According to some embodiments, the wireless communication device communicates with a first subscription. The wireless communication device can perform a concurrent burst-level tune-away procedure with a second subscription. The wireless communication device also returns to communication with the first subscription. The tune-away procedure enables a communication device to interact with multiple subscriptions (e.g., multiple SIM-based subscriptions). Other aspects, embodiments, and features are also claimed and described.

36 Claims, 11 Drawing Sheets

(51) Int. Cl.
*H04W 76/04* (2009.01)
*H04W 60/00* (2009.01)
H04W 88/06 (2009.01)
H04W 68/02 (2009.01)

(56) References Cited

U.S. PATENT DOCUMENTS

| | | | |
|---|---|---|---|
| 7,848,305 B2* | 12/2010 | Joshi et al. | 370/345 |
| 7,986,661 B2 | 7/2011 | Bhattacharjee et al. | |
| 8,060,133 B1 | 11/2011 | Khanka et al. | |
| 8,064,405 B2* | 11/2011 | Parekh et al. | 370/332 |
| 8,068,835 B2* | 11/2011 | Parekh et al. | 455/436 |
| 8,094,554 B2 | 1/2012 | Gholmieh et al. | |
| 8,229,433 B2* | 7/2012 | Parekh et al. | 455/436 |
| 8,238,321 B2 | 8/2012 | Joshi et al. | |
| 8,290,460 B2 | 10/2012 | Hoepfner | |
| 8,346,270 B1 | 1/2013 | Singh et al. | 455/445 |
| 8,411,621 B2* | 4/2013 | Barriac | 370/329 |
| 8,526,946 B2 | 9/2013 | Pattaswamy et al. | |
| 8,738,021 B2* | 5/2014 | Mutya et al. | 455/452.1 |
| 8,743,779 B2* | 6/2014 | Ngai | 370/328 |
| 8,774,811 B2* | 7/2014 | Chou et al. | 455/437 |
| 8,879,506 B1* | 11/2014 | Singh et al. | 370/331 |
| 2006/0176870 A1* | 8/2006 | Joshi et al. | 370/345 |
| 2007/0072643 A1 | 3/2007 | Jiang et al. | |
| 2007/0097922 A1* | 5/2007 | Parekh et al. | 370/332 |
| 2008/0274742 A1 | 11/2008 | Bi | |
| 2009/0046637 A1* | 2/2009 | Kim et al. | 370/329 |
| 2009/0131054 A1 | 5/2009 | Zhang | |
| 2009/0279517 A1 | 11/2009 | Chin et al. | |
| 2011/0077003 A1* | 3/2011 | Shin | 455/434 |
| 2011/0130086 A1* | 6/2011 | Sinnarajah et al. | 455/3.01 |
| 2011/0217969 A1 | 9/2011 | Spartz et al. | |
| 2012/0021755 A1* | 1/2012 | Chin et al. | 455/450 |
| 2012/0027003 A1* | 2/2012 | Chin et al. | 370/342 |
| 2012/0028657 A1 | 2/2012 | Chin et al. | |
| 2012/0039261 A1* | 2/2012 | Chin et al. | 370/329 |
| 2012/0040672 A1* | 2/2012 | Chin et al. | 455/436 |
| 2012/0051285 A1 | 3/2012 | Hou | |
| 2012/0057525 A1 | 3/2012 | Hou | |
| 2012/0058748 A1* | 3/2012 | Jeung et al. | 455/414.1 |
| 2012/0088501 A1* | 4/2012 | Chin et al. | 455/433 |
| 2012/0088502 A1* | 4/2012 | Chin et al. | 455/433 |
| 2012/0135715 A1 | 5/2012 | Kang et al. | |
| 2012/0149361 A1* | 6/2012 | Esch et al. | 455/422.1 |
| 2012/0190362 A1 | 7/2012 | Subbarayudu et al. | |
| 2012/0231802 A1* | 9/2012 | Ngai | 455/450 |
| 2012/0294291 A1 | 11/2012 | Su et al. | |
| 2012/0322504 A1* | 12/2012 | Chou et al. | 455/558 |
| 2013/0065644 A1 | 3/2013 | Bishop et al. | |
| 2013/0210484 A1 | 8/2013 | Jeenagala et al. | |
| 2013/0303139 A1 | 11/2013 | Helfre et al. | |
| 2013/0337861 A1 | 12/2013 | Bhogaraju et al. | |
| 2014/0119345 A1 | 5/2014 | Sikri et al. | |
| 2014/0120925 A1 | 5/2014 | Kanthala et al. | |

OTHER PUBLICATIONS

International Search Report and Written Opinion—PCT/US2013/068156—ISA/EPO—Feb. 10, 2014.

* cited by examiner

OPTIMIZED SCHEDULING SUBSCRIPTION PROCEDURES ON A WIRELESS COMMUNICATION DEVICE

PRIORITY CLAIM & CROSS-REFERENCE TO RELATED APPLICATIONS

This patent application claims priority to and the benefit of U.S. Provisional Application No. 61/721,118, filed on 1 Nov. 2012. This patent application is also related to and is a continuation-in-part of U.S. Non-Provisional application Ser. Nos. 13/739,738 filed 11 Jan. 2013, and 13/758,719, filed 4 Feb. 2013. All of said applications are incorporated herein by reference as if fully set forth below in their entireties and for all applicable purposes.

TECHNICAL FIELD

The technology discussed in this application relates generally to communication systems, and more specifically to systems and methods for optimized scheduling subscription procedures on a wireless communication device.

BACKGROUND

Wireless communication systems have become an important means by which many people worldwide have come to communicate. A wireless communication system may provide communication for a number of mobile devices, each of which may be serviced by a base station.

Within wireless communications systems, base stations may periodically send data, such as voice data, user data, and/or control data to mobile devices residing in wireless networks. In some instances, a mobile device may receive multiple sets of data, sometimes from multiple base stations. For example, a mobile device may maintain multiple subscriptions at the same time. Benefits may be realized by improving how mobile devices maintain multiple subscriptions.

SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method for scheduling concurrent procedures on a wireless communication device is described. The method includes communicating via a first subscription. A concurrent burst-level tune-away procedure with a second subscription is performed. The method also includes returning to communicating via the first subscription.

Performing the concurrent burst-level tune-away procedure with the second subscription may include tuning away to the second subscription, concurrently communicating via the second subscription and tuning back to the first subscription. Communicating via the second subscription may include communicating via a common control channel. The common control channel may be one of a paging channel, a broadcast control channel, and a shared channel.

The first subscription may be a transfer subscription and the second subscription may be an idle subscription. The transfer subscription may include a first transfer block. The idle subscription may include an idle block. The first transfer block may overlap the idle block. Tuning away to the idle subscription, concurrently communicating via the idle subscription and tuning back to the transfer subscription may occur multiple times during the first transfer block.

The transfer subscription may also include a second transfer block. The second transfer block may be lost while performing the concurrent burst-level tune-away procedure with the second subscription. The first transfer block and the second transfer block may include multiple transfer frames. The idle block may include multiple control frames. The transfer frames of the first transfer block may be misaligned with the control frames of the idle block. Performing the concurrent burst-level tune-away procedure with the second subscription may be canceled during a first frame of the multiple control frames. Performing the concurrent burst-level tune-away procedure with the second subscription may be canceled during a last frame of the multiple control frames.

One of voice data transmissions and user data transmissions may be received via the transfer subscription. The first subscription may correspond to a first base station and the second subscription may correspond to a second base station. The first subscription and the second subscription may instead correspond to a single base station. The first subscription may correspond to operating in a first subscriber identity module mode and the second subscription may correspond to operation in a second subscriber identity module mode. The method may be performed on a single transceiver.

An apparatus for scheduling concurrent procedures on a wireless communication device is also described. The apparatus includes a processor, memory in electronic communication with the processor, and instructions stored in the memory. The instructions are executable by the processor to communicate via a first subscription. The instructions are also executable by the processor to perform a concurrent burst-level tune-away procedure with a second subscription. The instructions are further executable by the processor to return to communicating via the first subscription.

A computer-program product for scheduling concurrent procedures on a wireless communication device is described. The computer-program product includes a non-transitory computer-readable medium having instructions thereon. The instructions include code for causing the wireless communication device to communicate via a first subscription. The instructions also include code for causing the wireless communication device to perform a concurrent burst-level tune-away procedure with a second subscription. The instructions further include code for causing the wireless communication device to return to communicating via the first subscription.

An apparatus configured for scheduling concurrent procedures on a wireless communication device is also described. The apparatus includes means for communicating via a first subscription. The apparatus also includes means for performing a concurrent burst-level tune-away procedure with a second subscription. The apparatus further includes means for returning to communicating via the first subscription.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
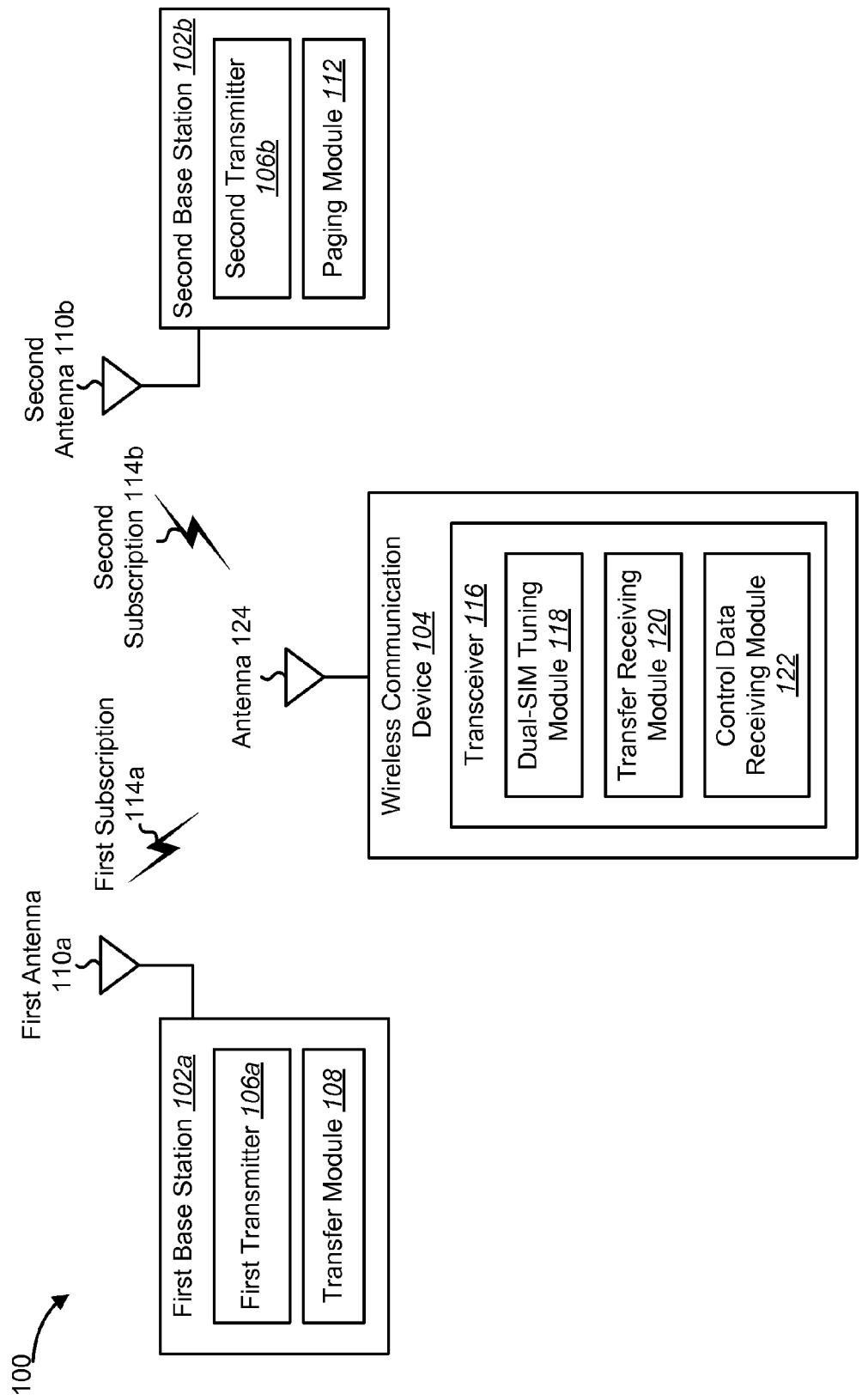
FIG. 1 shows an example of a wireless communication system in which the systems and methods disclosed herein may be utilized.

FIG. 1 shows an example of a wireless communication system 100 in which the systems and methods disclosed herein may be utilized. The wireless communication system 100 may include a first base station 102a, a second base station 102b, and a wireless communication device 104. The wireless communication device 104 may employ GSM/EDGE (global system for mobile communications/enhanced data rates for GSM evolution) radio access network (GERAN) burst-level tuning. GERAN burst-level tuning may allow the wireless communication device 104 to perform concurrent procedures on multiple subscriptions 114a-b simultaneously employed by the wireless communication device 104.

As used herein, the term "wireless communication device" refers to an electronic device that may be used for voice and/or data communication over a wireless communication system 100. Examples of wireless communication devices 104 may include access terminals, client devices, client stations, etc., and may wirelessly communicate with other communication devices (e.g., base stations 102 and wireless communication devices 104). Some wireless communication devices 104 may be referred to as stations (STAs), mobile devices, mobile stations (MSs), subscriber stations, user equipments (UEs), remote stations, access terminals, mobile terminals, terminals, user terminals, subscriber units, etc. Additional examples of wireless communication devices 104 include laptop or desktop computers, cellular phones, smart phones, wireless modems, e-readers, tablet devices, gaming systems, etc.

Further, the term "base station" refers to a wireless communication station that is used to communicate with wireless communication devices 104. A base station 102 may alternatively be referred to as an access point (including nano-, pico- and femto-cells), a Node B, an evolved Node B (eNodeB), a Home Node B, or some other similar terminology.

The first base station 102a may include a first transmitter 106a, a transfer module 108, and a first antenna 110a. The first transmitter 106a may process and prepare voice, data, and other signals to be sent from the first base station 102a to the wireless communication device 104. The transfer module 108 may send data, such as voice data and/or user data to the wireless communication device 104. For example, the transfer module 108 may send voice data via the first transmitter 106a and the first antenna 110a. The data may be sent to the wireless communication device 104 as a first subscription 114a.

The second base station 102b may include a second transmitter 106b, a paging module 112, and a second antenna 110b. The second transmitter 106b may process and prepare voice, data, and other signals to be sent from the second base station 102b to the wireless communication device 104. The paging module may generate and send out page messages to the wireless communication device 104. For example, a page message may be sent to the wireless communication device 104 via the second transmitter 106b and the second antenna 110b. The page message may be sent to the wireless communication device 104 via a second subscription 114b. The wireless communication system 100 uses page messages to broadcast paging information to one or more wireless communication devices 104. For example, a page message may be sent to the wireless communication device 104 to alert the wireless communication device 104 of an incoming voice call. Page messages may also pass other types of control information to the wireless communication device 104.

The wireless communication device 104 may include a transceiver 116 that includes a dual-subscriber identity module (SIM) tuning module 118, a transfer receiving module 120, a control data receiving module 122, and an antenna 124. The transceiver 116 may transmit and a receive communications from the first base station 102a and the second base station 102b via the antenna 124. For example, the transceiver 116 may receive communications from the first base station 102a associated with the first subscription 114a and/or the second subscription 114b. In some configurations, the wireless communication device 104 may include multiple transceivers 116. In these configurations, the tuning module 118 can be configured to tune between additional subscription.

Multi-SIM technology allows the wireless communication device 104 to use multiple subscriber identity module (SIM) cards. Accordingly, the wireless communication device 104 may employ a first SIM card that communicates with a first subscription 114a and a second SIM card that communicates with a second subscription 114b. Additional SIM cards may also be employed in other configurations. In addition, the communication device 104 can be configured to interact with multiple subscriptions numbering more than two.

In some configurations, the wireless communication device 104 may communicate with the first subscription 114a while the second subscription 114b is idle. For example, the wireless communication device 104 may be receiving voice data via the first subscription 114a while the wireless communication device 104 is not sending or receiving data via the second subscription 114b. Similarly, the wireless communication device 104 may communicate using the second subscription 114b while the first subscription 114a is idle. Because the wireless communication device 104 has only a single transceiver 116, the wireless communication device 104 may only tune to receive one subscription at a time.

As another example, if the wireless communication device 104 is communicating voice data (e.g., phone call), the wireless communication device 104 may not be sending or receiving data via the first subscription 114a. The process of switching between an active SIM card and an idle SIM card may be referred to as dual SIM dual standby (DSDS). In some configurations of multi-SIM wireless communication devices 104, one or more of the SIM cards may be hot-swappable while not in use.

The first subscription 114a and the second subscription 114b may correspond to a common radio access technology (RAT) or to different RATs. For example, the first subscription 114a may correspond to GERAN technology while the second subscription 114b may correspond to long-term evolution (LTE) technology. As other example, both the first subscription 114a and the second subscription 114b may correspond to GERAN technology.

The dual-SIM tuning module 118 assists the wireless communication device 104 in switching (e.g., tuning) from the first subscription 114a to the second subscription 114b and vise-versa. The first subscription 114a may correspond to a transfer subscription. A transfer subscription may be a subscription that is actively sending or receiving data, such as voice data and/or user data, to the wireless communication device 104. For the sake of simplicity, the first subscription 114a may be referred to as the transfer subscription herein. However, it should be appreciated that the transfer subscription may be the second subscription 114b or another subscription (not shown) that transfers data between a base station 102 and a wireless communication device 104. A base station 102 may be the first base station 102a, the second base station 102b, or another base station (not shown).

The second subscription 114b may correspond to an idle subscription. An idle subscription may be a subscription that is not transferring data because the single transceiver 116 on the wireless communication device 104 is tuned to receive data via another subscription, such as the transfer subscription. For the sake of simplicity herein, the second subscription 114 may be referred to as the idle subscription. Again, it should be appreciated that the idle subscription may be the first subscription 114a or another subscription (not shown) that transfers data between a base station 102 and the wireless communication device 104. A base station may be the first base station 102a, the second base station 102b, or another base station (not shown).

According to systems and methods of the present invention, the wireless communication device 104 may employ burst-level tuning to concurrently perform procedures on both the first subscription 114a and the second subscription 114b. Burst-level tuning may be used in a GERAN system. As an example, burst-level tuning may allow a wireless communication device 104 to tune-away from the first subscription 114a, which may be providing data or a voice call, to perform other concurrent activities, such as neighbor cell broadcast channel (BCCH) reads, or page reads, etc., on the second subscription 114b. In this manner, burst-level tuning allows for efficient tuning and scheduling on a wireless communication device 104 that has only a single transceiver 116, or a single transmitter 116 that corresponds to multiple subscriptions 114a-b. Additionally, while the systems and methods of the present invention may be employed with a wireless communication device 104 in dual-SIM mode or multi-SIM mode, the systems and methods of the present invention may also be employed in single SIM mode to receive information from neighbor cells.

Employing burst-level tuning allows a wireless communication device 104 with a single transceiver 104 to perform short duration idle subscription procedures with minimal impact to the transfer subscription throughput. As a result, paging reception performance is improved over current methods that employ multi-SIM tuning. However, paging data throughput performance and voice/user data throughput performance may be lower than in systems that employ only single SIM.

As an example of improved performance, idle subscription procedures such as reading the paging channel (PCH), reading the BCCH, and reconfirming synchronization channel (SCH) may be performed concurrently with performing transfer subscription procedures. As another example, burst-level tuning may allow for idle subscription power measures to be performed on the transfer subscription using free slots, such as unused packet timing advance control channel (PTCCH) slots. Additionally, employing burst-level tuning may be an improvement over using temporary block flow (TBF) suspension mode, which operates at the radio block level and which can lead to more degradation in voice/user data throughputs.

The dual-SIM tuning module 118 may tune from the first subscription 114a to the second subscription 114b. For example, the dual-SIM tuning module 118 may tune-away from the transfer subscription to the idle subscription, as well as tune-back to the transfer subscription from the idle subscription. The dual-SIM tuning module 118 may tune to the idle subscription to receive messages from the second base station 102b. For example, the wireless communication device 104 may receive page messages or other control messages on a common control channel via the second subscription 114b.

In some configurations, tuning away from the first subscription 114a to the second subscription 114b and tuning back to the first subscription 114a may occur at the burst level. In other words, tuning may occur in a short burst, such as on a slot-by-slot level. Additional details regarding tuning away and tuning back will be discussed below.

The transfer receiving module 120 may receive and process data (e.g., voice data and/or user data) received at the wireless communication device 104. For example, the transfer receiving module 120 may be employed when the wireless communication device 104 is tuned to communicate with the first subscription 114a.

The control data receiving module 122 may receive and process messages and data corresponding to a common control channel and/or other control-type channels. For example, the wireless communication device 104 may tune to the second subscription 114b to receive a page message via the control data receiving module 122.

Figure 2:
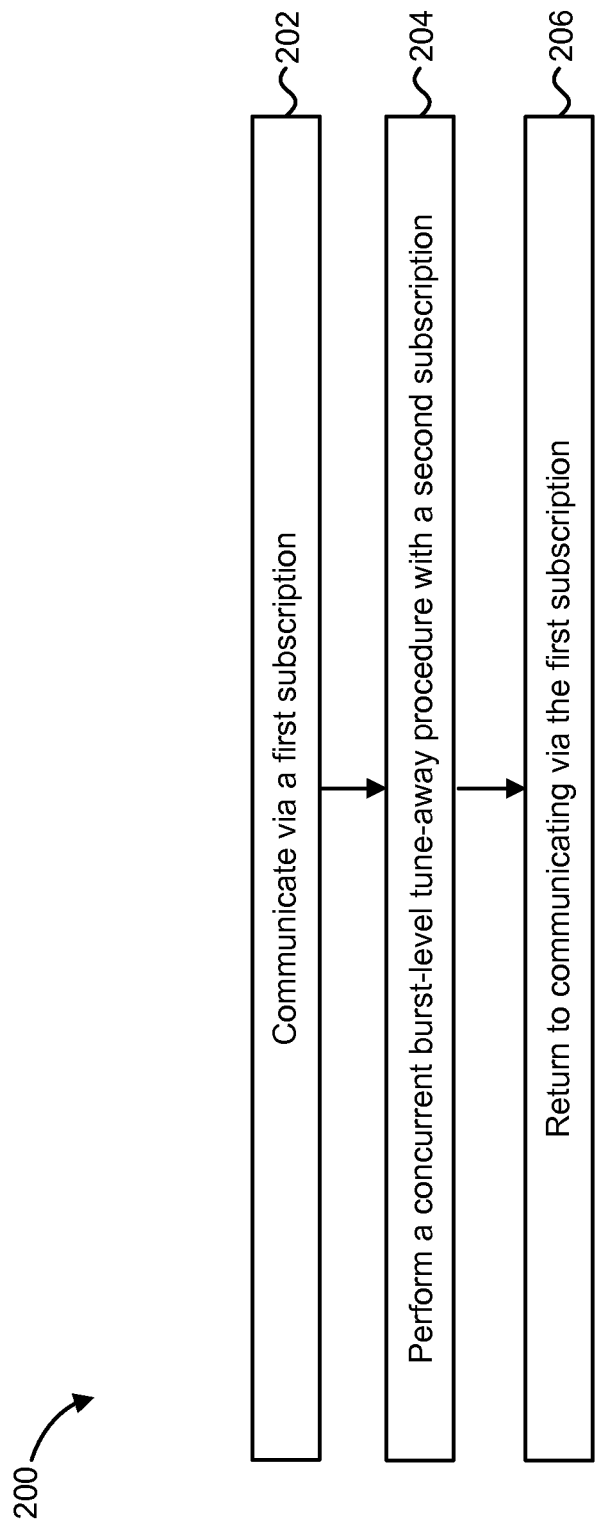
FIG. 2 is a flow diagram of a method for scheduling subscription procedures according to some embodiments of the present invention.

FIG. 2 is a flow diagram of a method 200 for scheduling subscription procedures according to some embodiments of the present invention. The method 200 may be performed by a wireless communication device 104. For example, the wireless communication device 104 described in connection with FIG. 1 may perform the method 200.

The wireless communication device 104 may communicate 202 via a first subscription 114a. The first subsection 114a may correspond to a first base station 102a. The first subscription 114a may transfer data, such as voice data and/or user data, between the first base station 102a and the wireless communication device 104. The first subscription 114a may be processed at the transfer receiving module 120 on the wireless communication device 104, for example.

The wireless communication device 104 may perform 204 a concurrent burst-level tune-away procedure with a second subscription 114b. The second subscription 114b may correspond to a second base station 102b and may provide control messages (e.g., page messages), from the second base station 102b to the wireless communication device 104, for example. The second subscription 114b may be processed at the control data receiving module 122 on the wireless communication device 104. The wireless communication device 104 may tune to the second subscription 114b to process page messages, for example, concurrently with processing data received via the first subscription 114a.

The wireless communication device 104 may return 206 to communicating via the first subscription 114a. In other words, the wireless communication device 104 may tune-back to the first subscription 114a. For example, the wireless communication device 104 may return to the first subscription 114a to again transfer data, such as voice data and/or user data.

Figure 3:
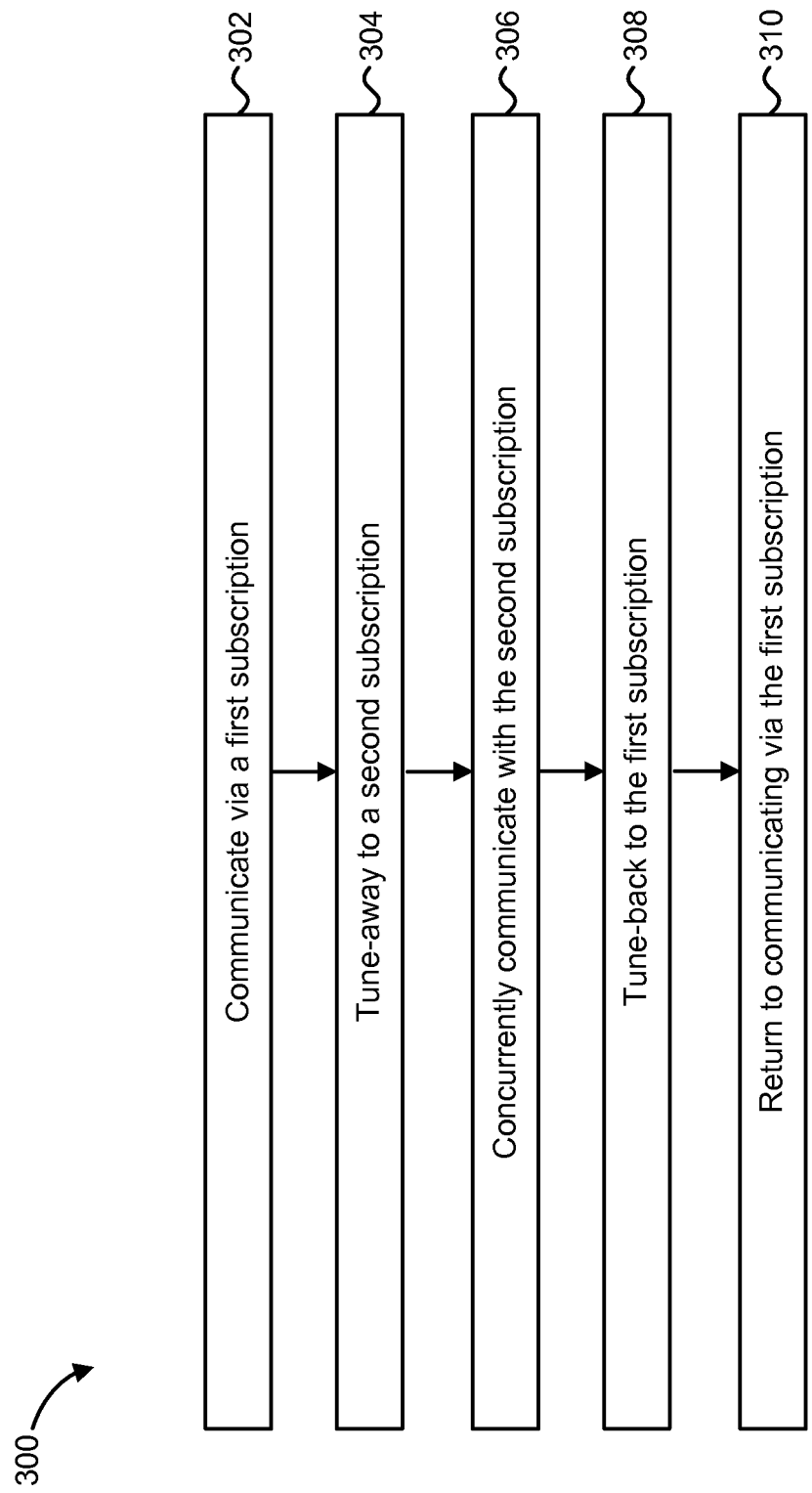
FIG. 3 is a flow diagram of a more detailed method for scheduling subscription procedures according to some embodiments of the present invention.

FIG. 3 is a flow diagram of a more detailed method 300 for scheduling subscription procedures according to some embodiments of the present invention. The method 300 may be performed by a wireless communication device 104. For example, the wireless communication device 104 described in connection with FIG. 1 may perform the method 300.

The wireless communication device 104 may communicate 302 via a first subscription 114a. The first subsection 114a may correspond to a first base station 102a and may provide data, such as voice data and/or user data, to the wireless communication device 104. The first subscription 114a may be processed at the transfer receiving module 120 on the wireless communication device 104, for example.

The wireless communication device 104 may tune-away 304 to a second subscription 114b. The second subscription 114b may correspond to a second base station 102b and may provide page messages to the wireless communication device 104. For example, the wireless communication device 104 may be receiving from the first base station 102a via the first subscription 114a, then may adjust a transceiver 116 to tune-away from receiving via the first subscription 114a, and may to tune to the second subscription 114b.

The wireless communication device 104 may concurrently communicate 306 via the second subscription 114b. For example, if the second subscription 114b corresponds to a paging channel, the wireless communication device 104 may concurrently receive a page message, or portions of a page message, via the second subscription 114b. In some configurations, the idle subscription may correspond to other common control channels, such as a broadcast channel (BCCH), a synchronization channel (SCH), etc. In these configurations, control data may be located in one or more control frames 442.

The wireless communication device 104 may then tune-back 308 to the first subscription 114a. For example, the wireless communication device 104 may tune the transceiver 116 back to the first subscription 114a. The wireless communication device 104 may return 310 to communicating via the first subscription 114a.

The process of tuning may occur in bursts. In other words, the duration of tuning away and tuning back may be one burst long. For example, the wireless communication device 104 may tune-away from the first subscription 114a in one burst, read the second subscription in a second burst, and tune-back to the first subscription 114a in a third burst. By employing burst-level tune-away procedures, the wireless communication device 104 may perform concurrent burst-level tune-away procedures on the first subscription 114a and the second subscription 114b. Additionally, multiple sets of bursts may occur within a radio block. Accordingly, tuning away from and tuning back to the first subscription 114a may occur within the period of a single radio block. Additional detail regarding burst-level tuning will be given in connection with FIG. 5 below.

Figure 4:
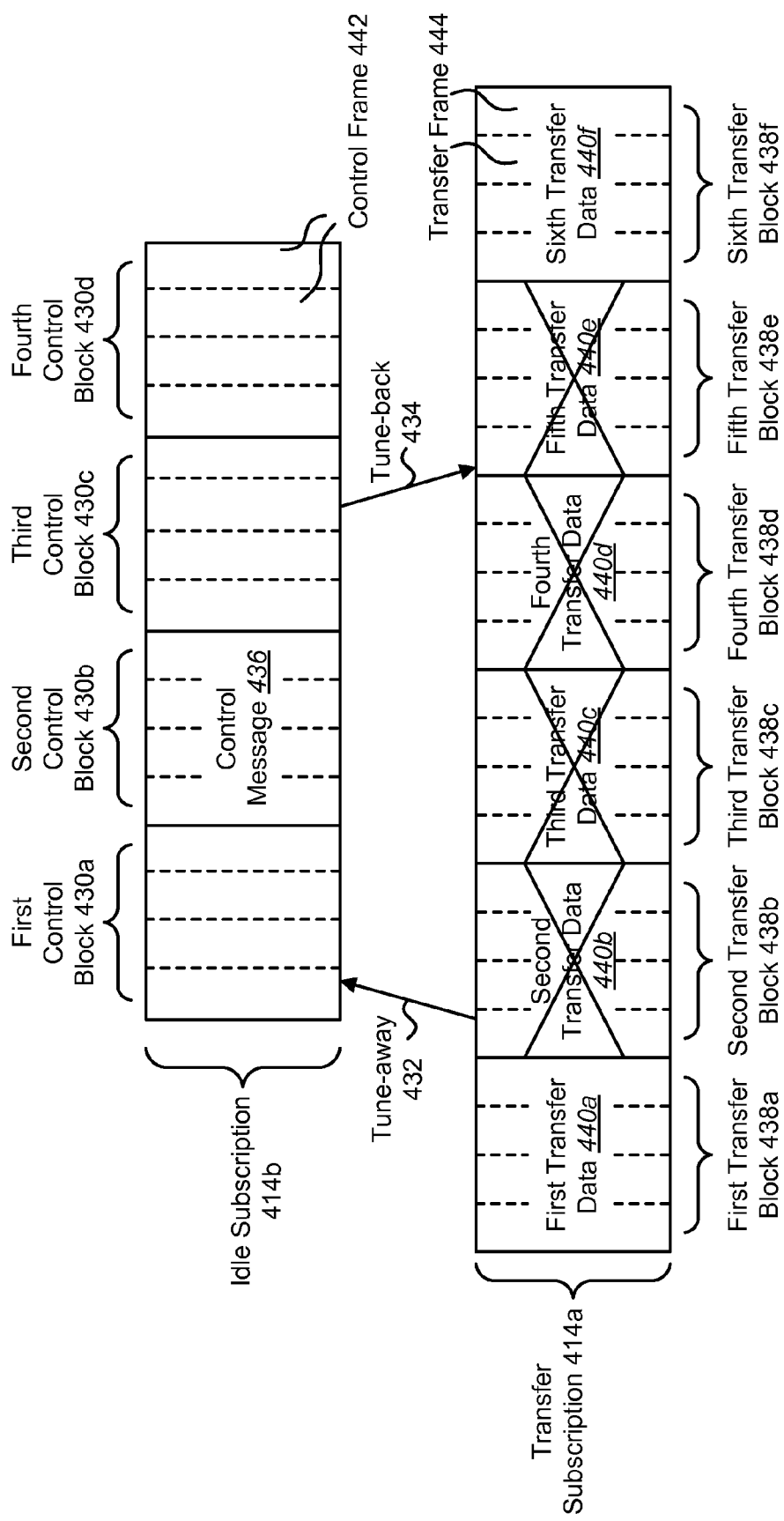
FIG. 4 is a block diagram illustrating a transfer subscription and idle subscription according to some embodiments of the present invention.

FIG. 4 is a block diagram illustrating a transfer subscription 414a and an idle subscription 414b according to some embodiments of the present invention. The transfer subscription 414a and the idle subscription 414b may correspond to the first subscription 114a and the second subscription 114b, respectively, described in connection with FIG. 1 above. However, it should be appreciated that in some configurations, the transfer subscription 414a may correspond to the second subscription 114b described in connection with FIG. 1 or another subscription not shown. Likewise, the idle subscription 414b may correspond to the first subscription 114a described in connection with FIG. 1 or another subscription not shown.

The transfer subscription 414a may transfer one or more radio blocks. For instance, the transfer subscription 414a may transfer radio blocks such as a first transfer block 438a, a second transfer block 438b, a third transfer block 438c, a fourth transfer block 438d, a fifth transfer block 438e, a sixth transfer block 438f, etc. Each transfer block 438 may include transfer data 440a-f, such as voice data and/or user data. For example, the transfer data 440 may be sent over an enhanced general packet radio service (EGPRS) network. Each transfer block 438 may include one or more transfer frames 444. Transfer frames 444 will be described in greater detail below in connection with FIG. 5.

The idle subscription 414b may include one or more idle radio blocks (i.e., idle blocks). For instance, the transfer subscription 414a may include idle blocks such as a first control block 430a, a second control block 430b, a third control block 430c, a fourth control block 430d, etc. Each control block 430 may include one or more control frames 442. A control frame 442 may be one type of idle frame in a control block 430. Control frames 442 will be described in greater detail below in connection with FIG. 5.

The control blocks 430 on the idle subscription 414b may be located on a paging channel (PCH). The paging channel may carry one or more control messages 436 to the wireless communication device 104. A control message 436 may be received over the span of multiple control frames 442. For example, the control message 436 may be received in the second control block 430b. In some configurations, the idle subscription 414b may correspond to the broadcast channel (BCCH), the synchronization channel (SCH) or another type of control channel.

In some configurations, the transfer blocks 438a-f and the control blocks 430a-d may each be 18.46 milliseconds (ms) in duration. The transfer subscription 414a and the idle subscription 414b may be misaligned. In other words, the radio blocks on the transfer subscription 414a may not be aligned in time (i.e., time aligned) with the radio blocks on the idle subscription 414b. For example, the first control frame 442 in the first control block 430a may not occur at the same instance of time as a first transfer frame 444 in the any of the transfer blocks 438a-f.

A wireless communication device 104 may receive transfer data 440 via the transfer subscription 414a. The wireless communication device 104 may tune-away 432 from the transfer subscription 414a and tune to the idle subscription 414b to receive a control message 436. The wireless communication device 104 may then tune-back 434 from the idle subscription 414b to the transfer subscription 414a, return to communicating with the transfer subscription 414a, and again receive transfer data 440.

In one configuration, such as in GERAN tune-away (GTA), the wireless communication device 104 may tune-away 432 from the transfer subscription 414a for multiple radio blocks. In other words, the wireless communication device 104 may tune to the idle subscription 414b for multiple radio blocks (e.g., control blocks 430) to receive the control message 436.

The wireless communication device 104 may monitor its own paging sub-channel for incoming pages. In other words, the wireless communication device 104 may monitor the paging sub-channel assigned to it by the wireless communication system 100. However, the wireless communication device 104 may not know which control block 430, on its own paging sub-channel, where the control message 436 will arrive. Accordingly, the wireless communication device 104 may need to tune-away 432 from the transfer subscription 414a for longer periods than necessary. For example, the wireless communication device 104 may need to tune-away 432 from the transfer subscription 414a to the idle subscription 414b for more than one control block 430. As shown in FIG. 4, the wireless device 104 may tune-away 432 to the idle subscription 414b during the first control block 430a. The control message 436 may be received during the second control block 430b. In some configuration, the wireless communication device 104 may tune-back 434 to the transfer subscription 414a after the third control block 430c.

It should be appreciated that the wireless communication device 104 may tune-away 432 to the idle subscription 414b, receive a control message 436 and tune-back 434 to the transfer subscription 414a in different transfer blocks 438 and control blocks 430 than described above. It should also be appreciated that tuning away 432 and tuning back 434 may be employed in GSM/EDGE Radio Access Network (GERAN) systems, as well as other communication systems, such as wideband code division multiple access (WCDMA) systems.

For each control block 430 in which the wireless communication device 104 is tuned away 432 from the transfer subscription 414a, the wireless communication device 104 is not receiving transfer data 440 via the transfer subscription 414a. Furthermore, if the wireless communication device 104 tunes away 432 or tunes back 434 to the transfer subscription 414a during a transfer block 438, the wireless communication device 104 may lose any data transmitted by the network in that transfer block 438. For example, if the wireless communication device 104 tunes away 432 from the transfer subscription 414a during the second transfer block 438b and tunes back 434 to the transfer subscription 414a during the fifth transfer block 438e, any data transmitted in the second transfer block 438b (e.g., the second transfer data 440b) to the fifth transfer block 438e (e.g., the fifth transfer data 440e) may be lost and/or unusable. This transfer data 440 loss may be caused, in part, by misalignment. In other words, misalignment of the transfer subscription 414a and the idle subscription 414b often causes additional transfer blocks 438 to be lost. This is because misalignment causes some frames (control frames 442 and/or transfer frames 444) to be missed when tuning between subscriptions 114. If even a single frame of a radio block (such as a control block 430 or a transfer block 438) is missed, the data in the entire radio block may be lost (e.g., the control message 436 or transfer data 440).

In addition, because the wireless communication device 104 may be tuned away 432 from the transfer subscription 414a for the third transfer block 438c and the fourth transfer block 438d, the entire third transfer data 440c and the entire fourth transfer data 440d may also be lost. Thus, in the example shown in FIG. 4, the second transfer data 440b and the fifth transfer data 440e are lost because one or more transfer frames 444 are missed in each transfer block 438. Furthermore, the third transfer data 440c and the fourth transfer data 440d are lots because all of the transfer frames 444 are missed in each transfer block 438.

Figure 5:
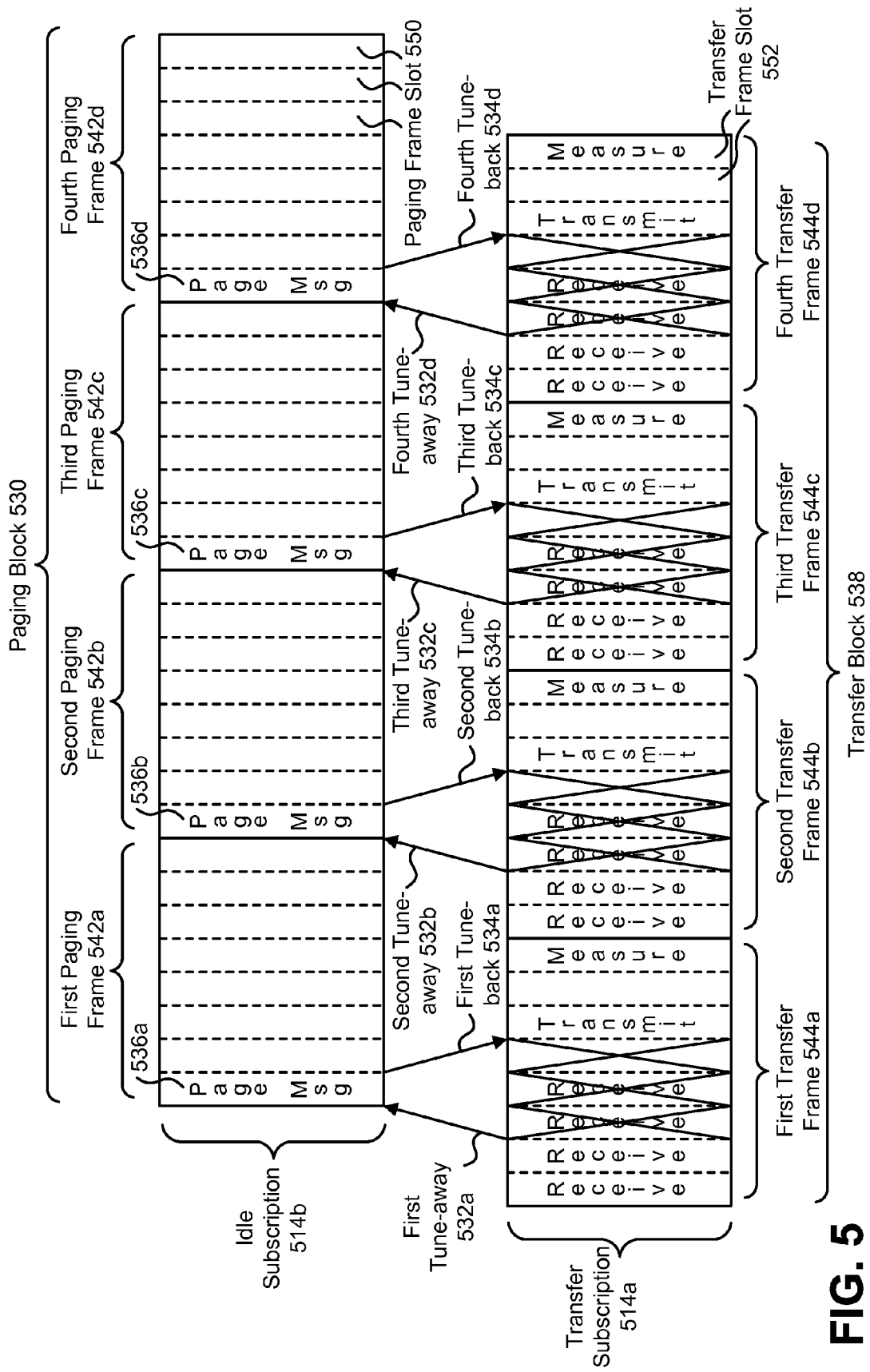
FIG. 5 is a block diagram illustrating one example of burst-level tuning between a transfer subscription and an idle subscription radio blocks according to some embodiments of the present invention.

FIG. 5 is a block diagram illustrating one example of burst-level tuning between a transfer subscription 514a and an idle subscription 514b according to some embodiments of the present invention. Burst-level tuning may be performed by a wireless communication device 104. For example, the wireless communication device 104 described in connection with FIG. 1 may perform burst-level tuning. As used herein, the term "burst-level" may refer to steps and procedures that occur on a slot level and a frame level rather than on a radio block level.

The transfer subscription 514a may correspond to the first subscription 114a and the idle subscription 514b may correspond the second subscription 114b described in connection with FIG. 1 above. However, it should be appreciated that in some configurations, the transfer subscription 514a may correspond to the second subscription 114b described in connection with FIG. 1 or another subscription (not shown). Likewise, the idle subscription 514b may correspond to the first subscription 114a described in connection with FIG. 1 or another subscription (not shown). Additionally, the transfer block 538 and the paging block 530 may correspond to, and be examples of, the transfer block 438 and the control block 430 described in connection with FIG. 4. For example, the transfer block 538 and the paging block 530 may be 18.46 milliseconds (ms) in duration.

The transfer subscription 514a may include one or more radio blocks. For instance, the transfer subscription 514a may include a radio block such as a transfer block 538. For simplicity, only a single transfer block 538 is shown. The transfer block 538 may include transfer data 440, such as voice data and/or user data. Each transfer block 538 may include four transfer frames 544a-d. The transfer block 538 may include a first transfer frame 544a, a second transfer frame 544b, a third transfer frame 544c, and a fourth transfer frame 544d.

Each transfer frame 544 may include transfer frame slots 552. There may be eight transfer frame slots 552 in each transfer frame 544. For simplicity, the transfer frame slots are not individually labeled in FIG. 5. In each transfer frame 544, the wireless communication device 104 may typically receive transfer data 440 during the first transfer frame slot 552 through the fourth transfer frame slot 552. The wireless communication device 104 may transmit during the sixth transfer frame slot 552 of each transfer frame 544. The wireless communication device 104 may perform measurements during the eighth transfer frame slot 552 of each transfer frame 544. For instance, the wireless communication device 104 may measure the channel conditions corresponding to the neighbor cell of the transfer subscription 514a during the eighth transfer frame slot 552 of each transfer frame 544.

It should be appreciated that the wireless communication device 104 may receive, transmit, measure, etc. in a variety of different configurations. For example, the wireless communication device 104 may transmit during the first transfer frame slot 552 and receive during the fifth through eighth transfer frame slots 552.

The idle subscription 514b may include one or more radio blocks, such as a paging block 530. For simplicity, only a single paging block 530 is shown. The paging block 530 may include four paging frames 542a-d, such as a first paging frame 542a, a second paging frame 542b, a third paging frame 542c, and a fourth paging frame 542d.

Each paging frame 542 may include multiple paging frame slots 550. For example, there may be eight paging frame slots 550 in each paging frame 542. For simplicity, the paging frame slots are not individually labeled in FIG. 5. In one configuration, each paging frame 542 may include a page message 536a-d, or a portion of a page message 536, during the first paging frame slot 550. It should be appreciated that page messages 536 may be received during any paging frame slot 550 of a paging frame 542.

The paging block 530 on the idle subscription 514b may be located on a paging channel (PCH). The paging channel may send one or more page messages 536 to the wireless communication device 104. The page message 536 may be include in one of the paging frames 542. For example, the page message 536 may be included in the first paging frame slot 550 of each paging frame 530. It should be appreciated that page message data may be located in different paging frame slots 550 than the first paging frame slot 550. For example, the paging frame may be in slot 0, 2, 4 or 6.

The wireless communication device 104 may perform burst-level tuning between the transfer subscription 514a and the idle subscription 514b. The wireless communication device 104 may receive transfer data 440 on the transfer subscription 514a. For example, the wireless communication device 104 may receive transfer data 440 during the first transfer frame slot 552 and the second transfer frame slot 552 of the first transfer frame 544a.

The wireless communication device 104 may perform a first tune-away 532a from the transfer subscription 514a to the idle subscription 514b during the third transfer frame slot 552. In this manner the wireless communication device 104 may perform a burst-level tuning away from the transfer subscription 514a. The wireless communication device 104 may tune to the idle subscription 514b. The wireless communication device 104 may read the page message 536a in the first paging frame slot 550 of the first paging frame 542a of the idle subscription 514b.

The paging block 530 and the transfer block 538 may be misaligned. In other words, the first paging frame slot 550 of the first paging frame 542a may not time align with the first transfer frame slot 552 of the first transfer frame 544a. However, the first paging frame slot 550 of the first paging frame 542a may correspond in time to the fourth transfer frame slot 552 of the first transfer frame 544a. In other words, the first paging frame slot 550 of the first paging frame 542a may be aligned in time to the fourth transfer frame slot 552 of the first transfer frame 544a. Even when the transfer block 538 and the paging block 530 are misaligned, burst-level tuning may be employed in a manner that allows procedures on the transfer subscription 514a and on the idle subscription 514b to be performed concurrently.

The wireless communication device 104 may perform a first tune-back 534a to the transfer subscription 514 at the burst-level. For example, the wireless communication device 104 may tune-back 534a to the transfer subscription 514a during the fifth transfer frame slot 552 of the first transfer frame 544a. Thus, the wireless communication device 104 may perform both a first tune-away 532a from and first tune-back 534a to the transfer subscription 514a during the same transfer frame 544 (e.g., the first transfer frame 544a). In this manner, burst-level tuning allows the wireless communication device 104 to concurrently perform procedures on both the transfer subscription 514a and on the idle subscription 514b.

The wireless communication device 104 may repeat burst-level tuning between the transfer subscription 514a and on the idle subscription 514b. For example, the wireless communication device 104 may perform burst-level tuning between the second transfer frame 544b and the second paging frame 542b by performing a second tuning away 532b and a second tuning back 534b during the second transfer frame 544b of the transfer subscription 514a. Similarly, burst-level tuning may be performed between the third transfer frame 544c and the third paging frame 542c (via a third tune-away 532c and a third tune-back 534c), and the fourth transfer frame 544d and the fourth paging frame 542d (via a fourth tune-away 532d and a fourth tune-back 534d).

Burst-level tuning allows the wireless communication device 104 to concurrently perform procedures on both the transfer subscription 514a and on the idle subscription 514b. Rather than losing multiple transfer blocks 538, which include transfer data 440, the impact may be reduced to losing only a single transfer block 538. Furthermore, transfer data throughput, such as on an EGPRS network, and paging reception performance may be improved.

Figure 6:
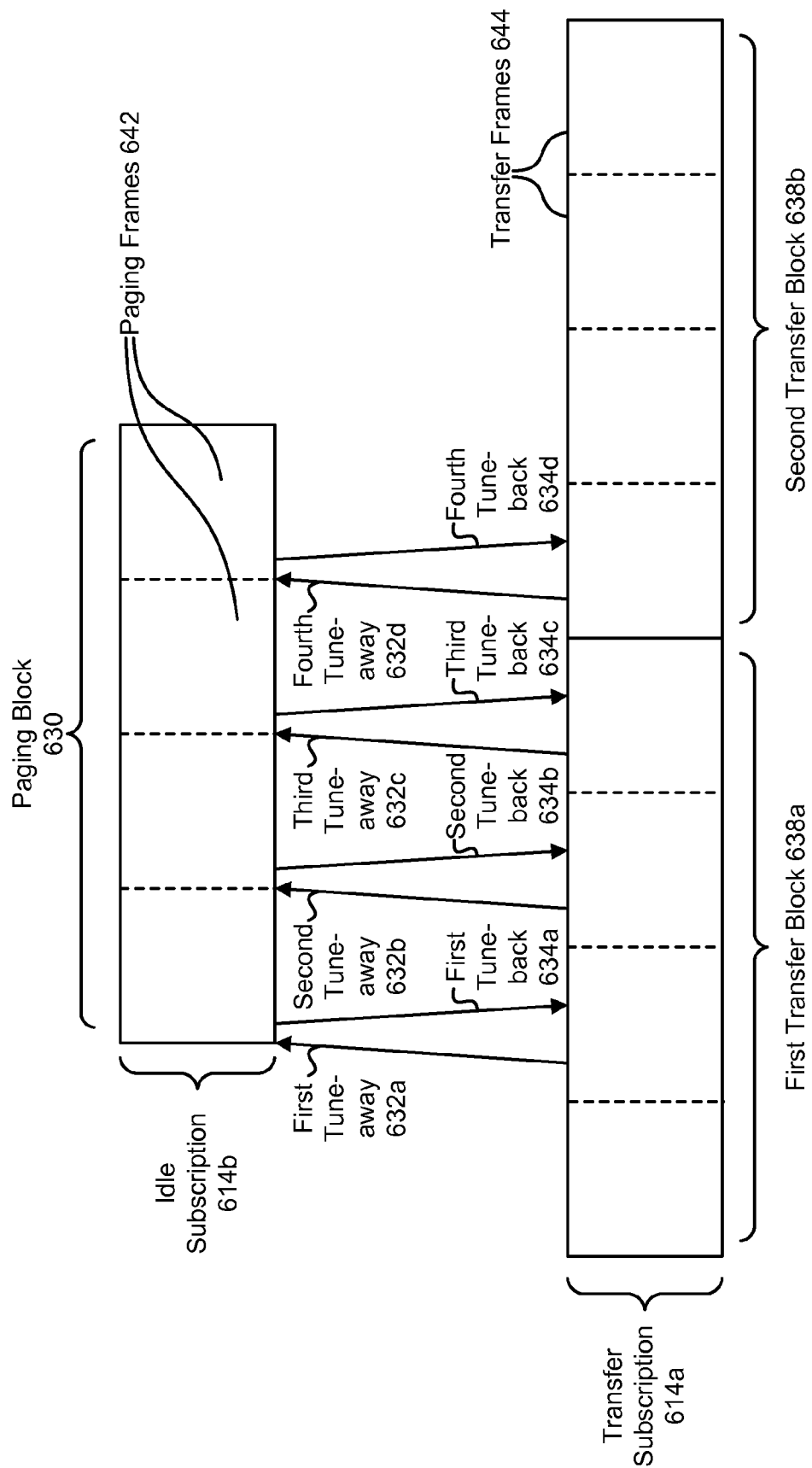
FIG. 6 is a block diagram illustrating another example of burst-level tuning between radio blocks on a transfer subscription and radio blocks on an idle subscription according to some embodiments of the present invention.

FIG. 6 is a block diagram illustrating another example of burst-level tuning between radio blocks on a transfer subscription 614a and radio blocks on an idle subscription 614b according to some embodiments of the present invention. Burst-level tuning may be performed on a wireless communication device 104. For example, the wireless communication device 104 described in connection with FIG. 1 may perform burst-level tuning.

The transfer subscription 614a may include a first transfer block 638a and a second transfer block 638b. Each transfer block 638 may include four transfer frames 644 and each transfer frame 644 may include eight transfer frame slots (not shown).

The idle subscription 614b may include a paging block 630, which may be one example of the paging block 530 described in connection with FIG. 5 above. The paging block 630 may include four paging frames 642. Each paging frame 642 may include eight paging slots (not shown).

The paging block 630 may be misaligned with the transfer blocks 638a-b. For example, the first three paging frames 642 of the paging block 630 may roughly overlap with the last three transfer frames 644 of the first transfer block 638a. The last paging frame 642 of the paging block 630 may roughly overlap with the first transfer frame 644 of the second transfer block 638b. As used herein, the term "roughly overlaps" may refer to at least half of the paging frame slots 550 in a paging frame 642 aligning with at least half of the transfer frame slots 552 of a corresponding transfer frame 644.

The wireless communication device 104 may perform burst-level tuning between the transfer subscription 614a and the idle subscription 614b. Because the paging block 630 may overlap both the first transfer block 638a and the second transfer block 638b, tuning away 632 and tuning back 634 may occur during both the first transfer block 638a and the second transfer block 638b. For example, the wireless communication device 104 may perform a first tune-away 632a, a first tune-back 634a, a second tune-away 632b, a second tune-back 634b, a third tune-away 632c, and a third tune-back 634c to and from the first transfer block 638a. The wireless communication device 104 may also perform a fourth tune-away 632d and a fourth tune-back 634d during the second transfer block 638b.

Tuning away 632 and tuning back 634 may be performed as described above. For instance, tuning away 632 and tuning back 634 may be performed on the burst-level.

In some configurations, the wireless communication device 104 may cancel performing one or more concurrent procedures. For example, the wireless communication device 104 may cancel performing one set of burst-level tunings to limit the impact of data loss to a single transfer block 638 on the transfer subscription 614a. Because paging frames 642 in the paging block 630 overlaps more transfer frames 644 in the first transfer block 638a than transfer frames 644 in the second transfer block 638b, the set of burst-level tunings corresponding to the second transfer block 638b may be canceled. In other words, the fourth tuning away 632d and the fourth tuning back 634d may be canceled. If only one set of burst-level tuning is canceled, the wireless communication device may still be able to obtain all the necessary paging information required through the remaining sets of burst-level tunings that occurred. Accordingly, throughput on the transfer subscription 614a may be improved by limiting any loss of transfer data 440 to only the second transfer block 638b.

Figure 7:
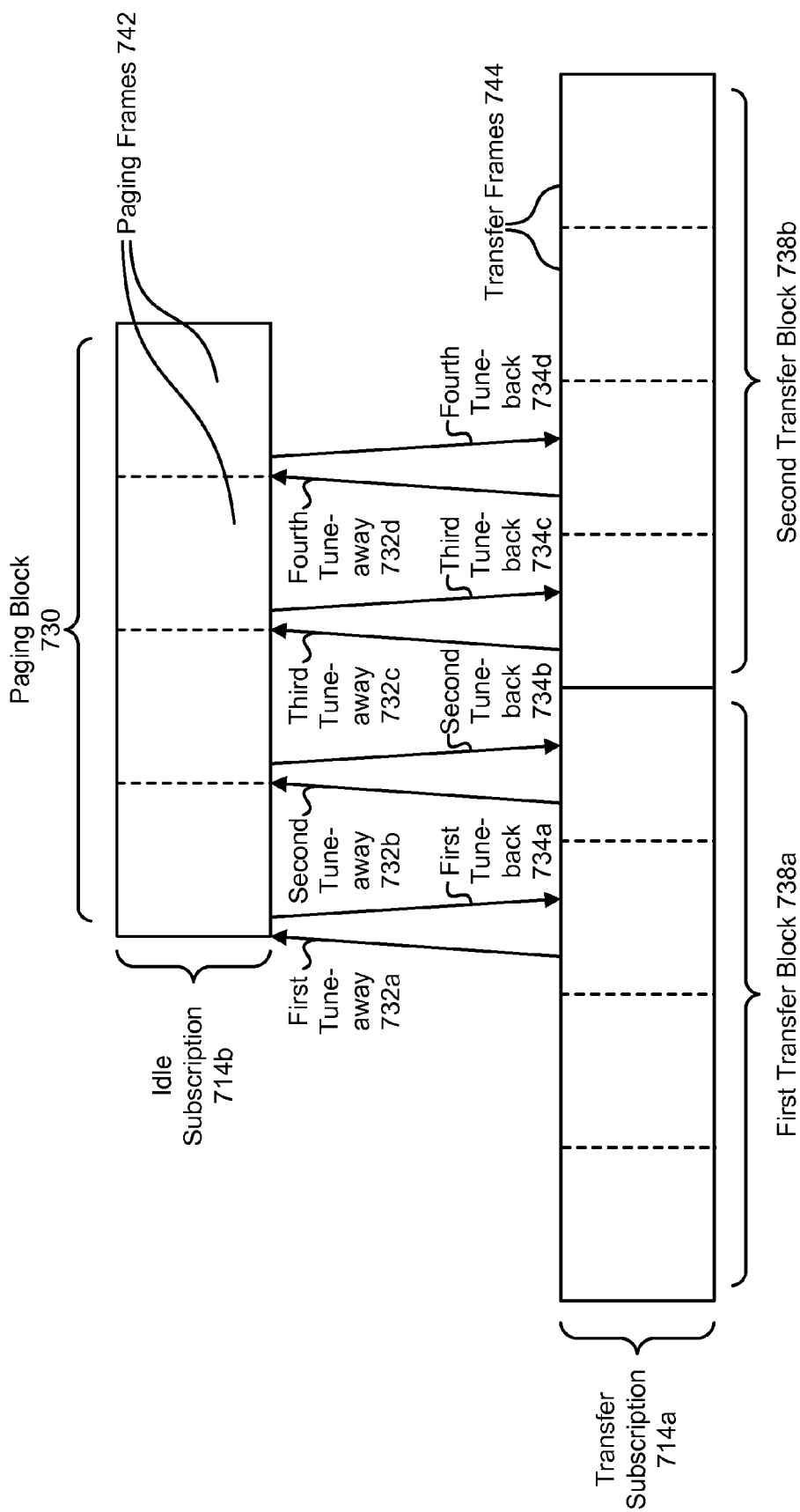
FIG. 7 is a block diagram illustrating yet another example of burst-level tuning between radio blocks on a transfer subscription and radio blocks on an idle subscription according to some embodiments of the present invention.

FIG. 7 is a block diagram illustrating yet another example of burst-level tuning between radio blocks on a transfer subscription 714a and radio blocks on an idle subscription 714b according to some embodiments of the present invention. Burst-level tuning may be performed on a wireless communication device 104. For example, the wireless communication device 104 described in connection with FIG. 1 may perform burst-level tuning.

The transfer subscription 714a may include a first transfer block 738a and a second transfer block 738b. The first transfer block 738a and second transfer block 738b may be one example of the transfer subscription 514a described in connection with FIG. 5 above. Each transfer block 738 may include four transfer frames 744. Each transfer frame 744 may include eight transfer frame slots (not shown).

The idle subscription 714b may include a paging block 730, which may be one example of the paging block 530 described in connection with FIG. 5 above. Each paging block 730 may include four paging frames 742 and each paging frame 742 may include eight paging frame slots (not shown).

The paging block 730 may be misaligned with the transfer blocks 738a-b. For example, the first two paging frames 742 of the paging block 730 may roughly overlap the last two transfer frames 744 of the first transfer block 738a. The last two paging frames 742 of the paging block 730 may roughly overlap the first two transfer frames 744 of the second transfer block 738b.

The wireless communication device 104 may perform burst-level tuning between the transfer subscription 714a and the idle subscription 714b. Because the paging block 730 overlaps both the first transfer block 738a and the second transfer block 738b, tuning away 732 and tuning back 734 may occur during both the first transfer block 738a and the second transfer block 738b. For example, the wireless communication device 104 may perform a first tune-away 732a, a first tune-back 734a, a second tune-away 732b, and a second tune-back 734b to and from the first transfer block 738a. The wireless communication device 104 may also perform a third tune-away 732c, a third tune-back 734c, a fourth tune-away 732d, and a fourth tune-back 734d during the second transfer block 738b.

Tuning away 732 and tuning back 734 may be performed as described above. For instance, tuning away 732 and tuning back 734 may be performed on the burst level.

In some configurations, the wireless communication device 104 may cancel one or more concurrent procedures. For example, the wireless communication device 104 may cancel the set of burst-level tunings corresponding to the first transfer block 738a (e.g., the first tune-away 732a, first tune-back 734a, second tune-away 732b, and second tune-back 734b). As another example, the wireless communication device 104 may cancel the set of burst-level tunings corresponding to the second transfer block 738b (e.g., the third tune-away 732c, third tune-back 734c, fourth tune-away 732d, and fourth tune-back 734d).

If the wireless communication device 104 cancels multiple sets of burst-level tunings, then the wireless communication device 104 may not be able to receive sufficient data on the idle subscription 714b to perform idle subscription procedures. For instance, if the wireless communication device 104 cancels the first tune-away 732a, first tune-back 734a, second tune-away 732b, and second tune-back 734b or if the wireless communication device 104 cancels the third tune-away 732c, third tune-back 734c, fourth tune-away 732d, and fourth tune-back 734d, then the wireless communication device 104 may not be able to receive a complete control message 436. In other words, if the wireless communication device 104 cancels multiple sets of burst-level tunings, concurrent processing on the idle subscription 714b may not occur.

If the wireless communication device 104 does not cancel any of the burst-level tuning sets, then concurrent processing of the transfer subscription 714a and the idle subscription 714b may occur. However, in this configuration, the loss of multiple transfer blocks 738 may result. In other words, the throughput of transfer data 440 may decrease as a result of tuning away 732 and tuning back 734 over multiple transfer blocks 738a-b.

Figure 8:
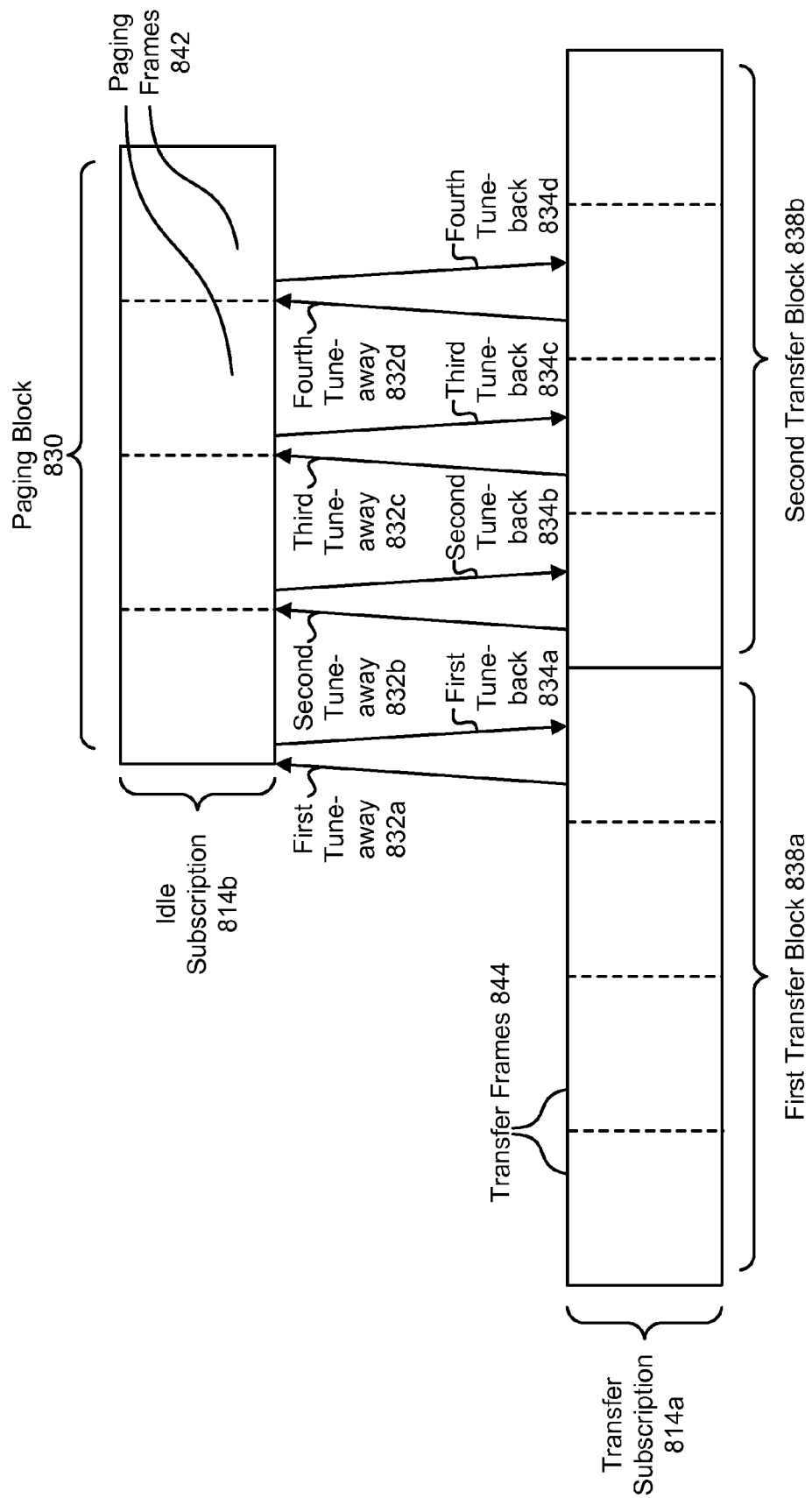
FIG. 8 is a block diagram illustrating another example of burst-level tuning between radio blocks on a transfer subscription and radio blocks on an idle subscription according to some embodiments of the present invention.

FIG. 8 is a block diagram illustrating another example of burst-level tuning between radio blocks on a transfer subscription 814a and radio blocks on an idle subscription 814b according to some embodiments of the present invention. Burst-level tuning may be performed on a wireless communication device 104. For example, the wireless communication device 104 described in connection with FIG. 1 may perform burst-level tuning.

The transfer subscription 814a may include a first transfer block 838a and a second transfer block 838b. The first transfer block 838a and second transfer block 838b may be one example of the transfer subscription 514a described in connection with FIG. 5 above. Each transfer block 838 may include four transfer frames 844. Each transfer frame 844 may include eight transfer frame slots (not shown).

The idle subscription 814b may include a paging block 830, which may be one example of the paging block 530 described in connection with FIG. 5 above. Each paging block 830 may include four paging frames 842. Each paging frame 842 may include eight paging frame slots (not shown).

The paging block 830 may be misaligned with the transfer blocks 838a-b. For example, the first paging frame 842 of the paging block 830 may roughly overlap the last transfer frame 844 of the first transfer block 838a. The last three paging frames 842 of the paging block 830 may roughly overlap the first three transfer frames 844 of the second transfer block 838b.

The wireless communication device 104 may perform burst-level tuning between the transfer subscription 814a and the idle subscription 814b. Because the paging block 830 overlaps both the first transfer block 838a and the second transfer block 838b, tuning away 832 and tuning back 834 may occur during both the first transfer block 838a and the second transfer block 838b. For example, the wireless communication device 104 may perform a first tune-away 832a to the idle subscription 814b and a first tune-back 834a to the transfer subscription 814a during the first transfer block 838a. The wireless communication device 104 may also perform a second tune-away 832b, a second tune-back 834b, a third tune-away 832c, a third tune-back 834c, a fourth tune-away 832d, and a fourth tune-back 834d during the second transfer block 838b.

Tuning away 832 and tuning back 834 may be performed as described above. For instance, tuning away 832 and tuning back 834 may be performed on the burst level.

In some configurations, the wireless communication device 104 may cancel performing concurrent procedures. For example, the wireless communication device 104 may cancel the set of burst-level tunings corresponding to the first transfer block 838a. Because paging frames 842 in the paging block 830 overlap more transfer frames 844 in the second transfer block 838b than transfer frames 844 in the first transfer block 838b, the set of burst-level tunings corresponding to the first transfer block 838a may be canceled. In other words, the first tune-away 832a and the first tune-back 834a may be canceled. If only one set of burst-level tuning is canceled, the wireless communication device 104 may still be able to obtain all the necessary paging information required through the remaining sets of burst-level tunings that occurred. Accordingly, throughput on the transfer subscription 814a may be improved by limiting any loss of transfer data 440 to only the first transfer block 838a. In this manner, the wireless communication device 104 may still perform concurrent procedures on the transfer subscription 814a and the idle subscription 814b through the remaining three burst-level sets (e.g., the second tune-away 832b, the second tune-back 834b, the third tune-away 832c, the third tune-back 834c, the fourth tune-away 832d, and the fourth tune-back 834d).

Figure 9:
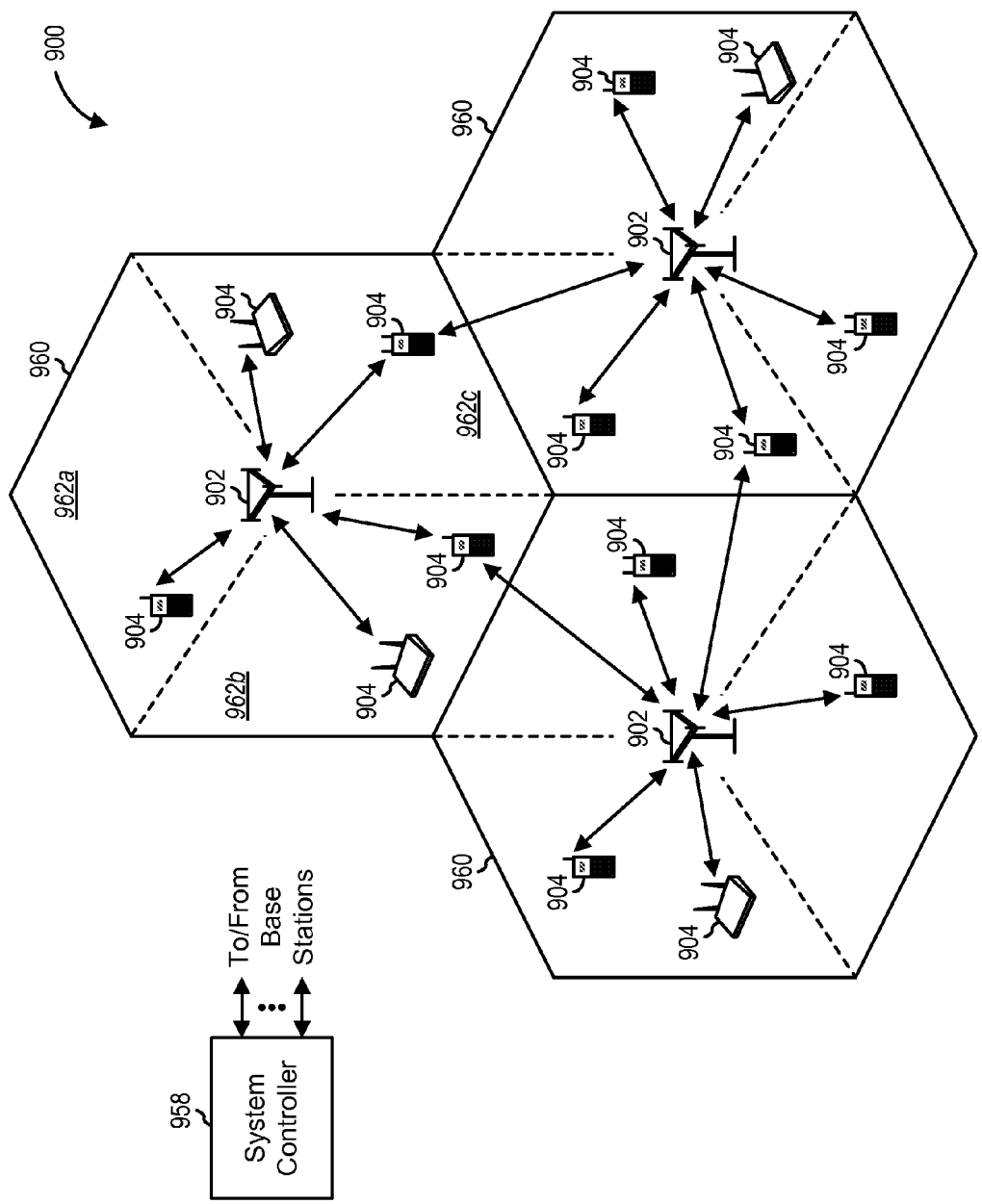
FIG. 9 shows another example of a wireless communication system in which the systems and methods disclosed herein may be utilized.

FIG. 9 shows an example of a wireless communication system 900 in which the systems and methods disclosed herein may be utilized. The wireless communication system 900 includes multiple base stations 902 and multiple wireless communication devices 904. Each base station 902 provides communication coverage for a particular geographic area 960. The term "cell" can refer to a base station 902 and/or its coverage area 960, depending on the context in which the term is used.

To improve system capacity, a base station coverage area 960 may be partitioned into plural smaller areas, e.g., three smaller areas 962a, 962b, and 962c. Each smaller area 962a, 962b, 962c may be served by a respective base transceiver station (BTS). The term "sector" can refer to a BTS and/or its coverage area 962, depending on the context in which the term is used. For a sectorized cell, the BTSs for all sectors of that cell are typically co-located within the base station 902 for the cell.

Wireless communication devices 904 are typically dispersed throughout the wireless communication system 900. A wireless communication device 904 may communicate with one or more base stations 902 on the downlink and/or uplink at any given moment. The downlink (or forward link) refers to the communication link from a base station 902 to a wireless communication device 904, and the uplink (or reverse link) refers to the communication link from a wireless communication device 904 to a base station 902. Uplink and downlink may refer to the communication link or to the carriers used for the communication link.

For a centralized architecture, a system controller 958 may couple to the base stations 902 and provide coordination and control for the base stations 902. The system controller 958 may be a single network entity or a collection of network entities. For a distributed architecture, base stations 902 may communicate with one another as needed.

Figure 10:
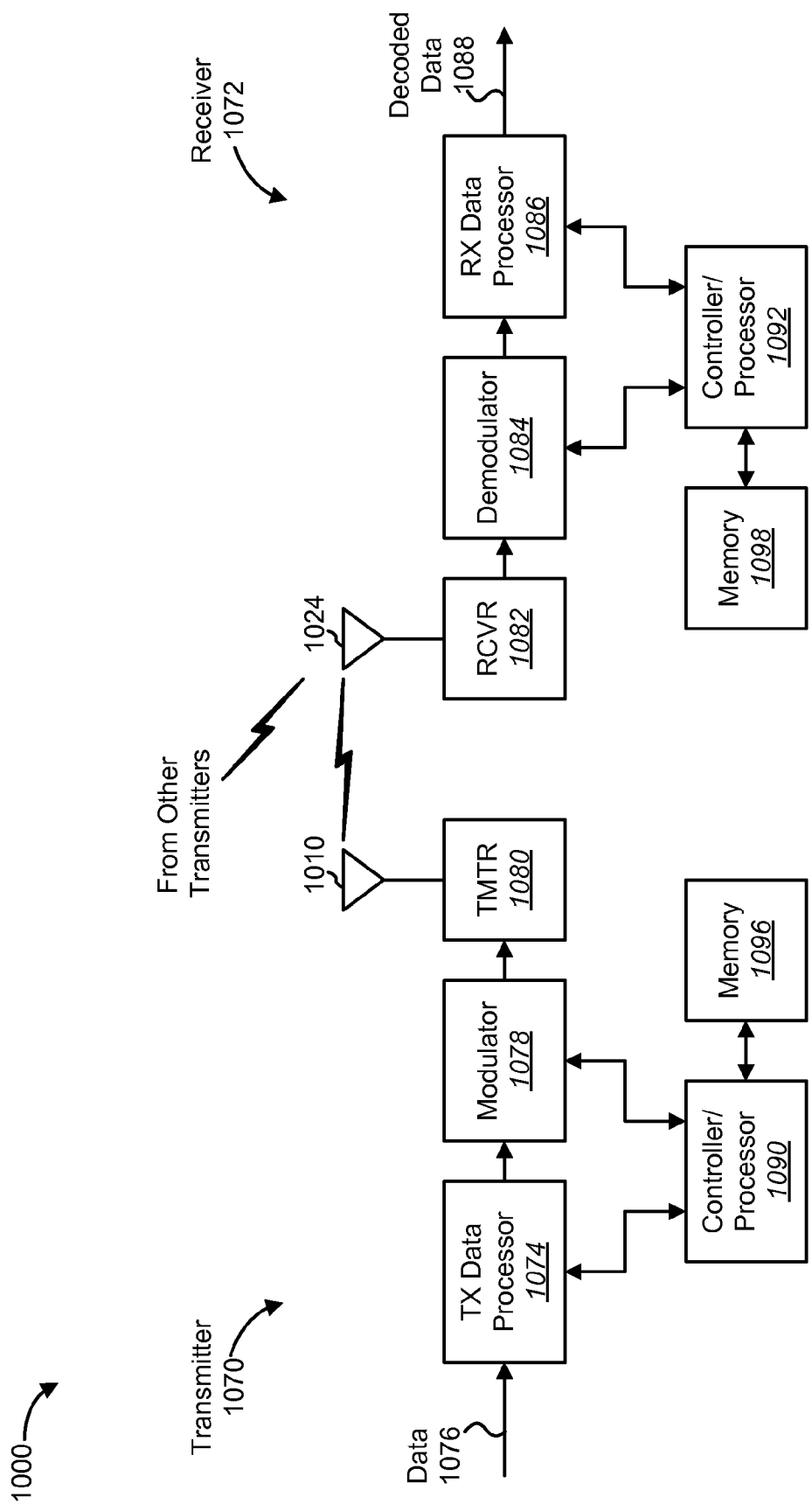
FIG. 10 shows a block diagram of a transmitter and a receiver in a wireless communication system.

FIG. 10 shows a block diagram of a transmitter 1070 and a receiver 1072 in a wireless communication system 1000. For the downlink, the transmitter 1070 may be part of a base station 102 and the receiver 1072 may be part of a wireless communication device 104. For the uplink, the transmitter 1070 may be part of a wireless communication device 104 and the receiver 1072 may be part of a base station 102.

At the transmitter 1070, a transmit (TX) data processor 1074 receives and processes (e.g., formats, encodes, and interleaves) data 1076 and provides coded data. A modulator 1078 performs modulation on the coded data and provides a modulated signal. The modulator 1078 may perform Gaussian minimum shift keying (GMSK) for GSM, 8-ary phase shift keying (8-PSK) for Enhanced Data rates for Global Evolution (EDGE), etc. GMSK is a continuous phase modulation protocol, whereas 8-PSK is a digital modulation protocol. A transmitter unit (TMTR) 1080 conditions (e.g., filters, amplifies, and upconverts) the modulated signal and generates an RF-modulated signal, which is transmitted via an antenna 1010.

At the receiver 1072, an antenna 1024 receives RF-modulated signals from the transmitter 1070 and other transmitters. The antenna 1024 provides a received RF signal to a receiver unit (RCVR) 1082. The receiver unit 1082 conditions (e.g., filters, amplifies, and downconverts) the received RF signal, digitizes the conditioned signal, and provides samples. A demodulator 1084 processes the samples as described below and provides demodulated data. A receive (RX) data processor 1086 processes (e.g., deinterleaves and decodes) the demodulated data and provides decoded data 1088. In general, the processing by demodulator 1084 and RX data processor 1086 is complementary to the processing by the modulator 1078 and the TX data processor 1074, respectively, at the transmitter 1070.

Controllers/processors 1090 and 1092 direct operation at the transmitter 1070 and receiver 1072, respectively. Memories 1096 and 1098 store program codes in the form of computer software and data used by the transmitter 1070 and receiver 1072, respectively.

Figure 11:
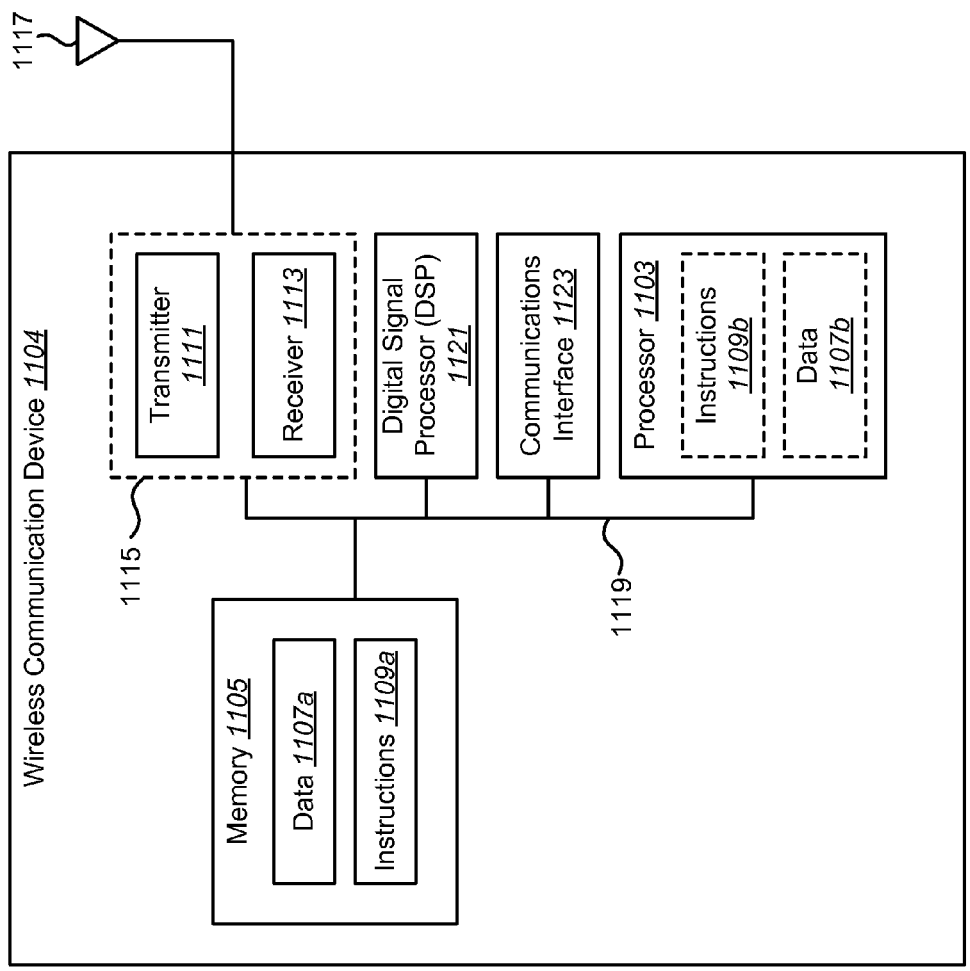
FIG. 11 illustrates certain components that may be included within a wireless communication device according to some embodiments of the present invention.

FIG. 11 illustrates certain components that may be included within a wireless communication device 1104 according to some embodiments of the present invention. The wireless communication device 1104 may be an access terminal, a mobile station, a user equipment (UE), etc. The wireless communication device 1104 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless communication device 1104 of FIG. 11, in an alternative configuration, a combination of processors (e.g., an ARM and DSP) could be used.

The wireless communication device 1104 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109, various portions of the instructions 1109b may be loaded onto the processor 1103, and various pieces of data 1107b may be loaded onto the processor 1103.

The wireless communication device 1104 may also include a transmitter 1111 and a receiver 1113 to allow transmission and reception of signals to and from the wireless communication device 1104 via an antenna 1117. The transmitter 1111 and receiver 1113 may be collectively referred to as a transceiver 1115. The wireless communication device 1104 may also include (not shown) multiple transmitters, multiple antennas, multiple receivers, and/or multiple transceivers.

The wireless communication device 1104 may include a digital signal processor (DSP) 1121. The wireless communication device 1104 may also include a communications interface 1123. The communications interface 1123 may allow a user to interact with the wireless communication device 1104.

The various components of the wireless communication device 1104 may be coupled together by one or more buses, which may include a power bus, a control signal bus, a status signal bus, a data bus, etc. For the sake of clarity, the various buses are illustrated in FIG. 11 as a bus system 1119.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The techniques described herein may be used for various communication systems, including communication systems that employ global system for mobile communications (GSM). GSM is a widespread standard in cellular, wireless communication. GSM is relatively efficient for standard voice services. However, high-fidelity audio and data services require higher data throughput rates than that for which GSM is optimized. To increase capacity, the general packet radio service (GPRS), enhanced data rates for GSM evolution (EDGE) and universal mobile telecommunications system (UMTS) standards have been adopted in GSM systems. In the GSM/EDGE Radio Access Network (GERAN) specification, GPRS and EGPRS provide data services. The standards for GERAN are maintained by the 3GPP (third generation partnership project). GERAN is a part of GSM. More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data to and from the public switched telephone network (PSTN) and internet to and from remote terminals. GERAN is also a part of combined UMTS/GSM networks.

GSM employs a combination of Time Division Multiple Access (TDMA) and frequency division multiple access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (mobile station to base transceiver station). For downlink communication, GSM 900 uses 935-960 MHz bands (base station to wireless communication device). Furthermore, each frequency band is divided into 200 kHz carrier frequencies providing 124 radio frequency (RF) channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800.

Furthermore, each base station may be assigned one or more carrier frequencies. Each carrier frequency is divided into eight time slots using TDMA such that eight consecutive time slots form one TDMA frame with a duration of 4.615 milliseconds (ms). A physical channel occupies one time slot within a TDMA frame. Each active wireless communication device or user is assigned one or more time slot indices for the duration of a call. User-specific data for each wireless communication device is sent in the time slot(s) assigned to that wireless communication device and in TDMA frames used for the traffic channels.

The techniques described herein may also be used for various communication systems, including communication systems that are based on an orthogonal multiplexing scheme. Examples of such communication systems include orthogonal frequency division multiple access (OFDMA) systems, single-carrier frequency division multiple access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that may carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2-3, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the systems, methods, and apparatus described herein without departing from the scope of the claims.

We claim:

1. A method for scheduling concurrent procedures on a wireless communication device, comprising:
    communicating via a transfer subscription that comprises a first transfer block and a second transfer block, wherein communicating via the transfer subscription comprises at least one of sending and receiving data;
    performing a tune-away procedure with an idle subscription that comprises an idle block, wherein performing the tune-away procedure with the idle subscription comprises temporarily discontinuing communicating via the transfer subscription and tuning away to the idle subscription, and wherein the idle block overlaps the first transfer block and the second transfer block; and
    canceling the tune-away procedure that occurs during one of the first transfer block and the second transfer block.

2. The method of claim 1, wherein performing the tune-away procedure with the idle subscription further comprises:
    communicating via the idle subscription; and
    tuning back to the transfer subscription.

3. The method of claim 1, wherein the second transfer block is lost while performing the tune-away procedure with the idle subscription.

4. The method of claim 1, wherein one of voice data transmissions and user data transmissions are received via the transfer subscription.

5. The method of claim 1, wherein the transfer subscription corresponds to a first base station and the idle subscription corresponds to a second base station.

6. The method of claim 1, wherein the transfer subscription and the idle subscription correspond to a single base station.

7. The method of claim 1, wherein the transfer subscription corresponds to operating in a first subscriber identity module mode and the idle subscription corresponds to operation in a second subscriber identity module mode.

8. The method of claim 1, wherein the method is performed on a single transceiver.

9. The method of claim 2, wherein communicating via the idle subscription comprises communicating via a common control channel.

10. The method of claim 2, wherein tuning away to the idle subscription, communicating via the idle subscription and tuning back to the transfer subscription occur multiple times during the first transfer block.

11. The method of claim 3, wherein the first transfer block and the second transfer block comprise multiple transfer frames, and wherein the idle block comprises multiple control frames.

12. The method of claim 9, wherein the common control channel is one of a paging channel, a broadcast control channel, and a shared channel.

13. The method of claim 11, wherein the transfer frames of the first transfer block are misaligned with the control frames of the idle block.

14. The method of claim 11, wherein the tune-away procedure is canceled during a first frame of the multiple control frames.

15. The method of claim 11, wherein the tune-away procedure is canceled during a last frame of the multiple control frames.

16. An apparatus for scheduling concurrent procedures on a wireless communication device, comprising:
   a processor;
   memory in electronic communication with the processor; and
   instructions stored in the memory, the instructions being executable by the processor to:
      communicate via a transfer subscription that comprises a first transfer block and a second transfer block, wherein communicating via the transfer subscription comprises at least one of sending and receiving data;
      perform a tune-away procedure with an idle subscription that comprises an idle block, wherein performing the tune-away procedure with the idle subscription comprises temporarily discontinuing communicating via the transfer subscription and tuning away to the idle subscription, and wherein the idle block overlaps the first transfer block and the second transfer block; and
      cancel the tune-away procedure that occurs during one of the first transfer block and the second transfer block.

17. The apparatus of claim 16, wherein the instructions executable to perform the tune-away procedure with the idle subscription further comprise instructions executable to:
   communicate via the idle subscription; and
   tune back to the transfer subscription.

18. The apparatus of claim 16, wherein the second transfer block is lost while performing the tune-away procedure with the idle subscription.

19. The apparatus of claim 16, wherein one of voice data transmissions and user data transmissions are received via the transfer subscription.

20. The apparatus of claim 16, wherein the transfer subscription corresponds to a first base station and the idle subscription corresponds to a second base station.

21. The apparatus of claim 16, wherein the transfer subscription and the idle subscription correspond to a single base station.

22. The apparatus of claim 16, wherein the transfer subscription corresponds to operating in a first subscriber identity module mode and the idle subscription corresponds to operation in a second subscriber identity module mode.

23. The apparatus of claim 16, wherein the communications are performed on a single transceiver.

24. The apparatus of claim 17, wherein the instructions executable to communicate via the idle subscription comprise instructions executable to communicate via a common control channel.

25. The apparatus of claim 17, wherein tuning away to the idle subscription, communicating via the idle subscription and tuning back to the transfer subscription occur multiple times during the first transfer block.

26. The apparatus of claim 18, wherein the first transfer block and the second transfer block comprise multiple transfer frames, and wherein the idle block comprises multiple control frames.

27. The apparatus of claim 24, wherein the common control channel is one of a paging channel, a broadcast control channel, and a shared channel.

28. The apparatus of claim 26, wherein the transfer frames of the first transfer block are misaligned with the control frames of the idle block.

29. The apparatus of claim 26, wherein the tune-away procedure is canceled during a first frame of the multiple control frames.

30. The apparatus of claim 26, wherein the tune-away procedure is canceled during a last frame of the multiple control frames.

31. A computer-program product for scheduling concurrent procedures on a wireless communication device, the computer-program product comprising a non-transitory computer-readable medium having instructions thereon, the instructions comprising:
   code for causing the wireless communication device to communicate via a transfer subscription that comprises a first transfer block and a second transfer block, wherein communicating via the transfer subscription comprises at least one of sending and receiving data;
   code for causing the wireless communication device to perform a tune-away procedure with an idle subscription that comprises an idle block, wherein performing the tune-away procedure with the idle subscription comprises temporarily discontinuing communicating via the transfer subscription and tuning away to the idle subscription, and wherein the idle block overlaps the first transfer block and the second transfer block; and
   code for causing the wireless communication device to cancel the tune-away procedure that occurs during one of the first transfer block and the second transfer block.

32. The computer-program product of claim 31, wherein the instructions to perform the tune-away procedure with the idle subscription further comprise:
   code for causing the wireless communication device to communicate via the idle subscription; and
   code for causing the wireless communication device to tune back to the transfer subscription.

33. The computer-program product of claim 31, wherein the second transfer block is lost while performing the tune-away procedure with the idle subscription.

34. The computer-program product of claim 31, wherein the transfer subscription corresponds to operating in a first subscriber identity module mode and the idle subscription corresponds to operation in a second subscriber identity module mode.

35. The computer-program product of claim 33, wherein the first transfer block and the second transfer block comprise multiple transfer frames, and wherein the idle block comprises multiple control frames.

36. The computer-program product of claim 35, wherein the transfer frames of the first transfer block are misaligned with the control frames of the idle block.

* * * * *